United States Patent [19]

Mitchell, Jr.

[11] 3,947,599

[45] Mar. 30, 1976

[54] PROCESS FOR MAKING FLAVORLESS FOOD EXTENDERS DERIVED FROM PEANUTS, AND A METHOD OF RECOVERING PEANUT OIL

[76] Inventor: Jack H. Mitchell, Jr., 101 Bradley St., Clemson, S.C. 29631

[22] Filed: Jan. 30, 1975

[21] Appl. No.: 545,446

[52] U.S. Cl. ............... 426/250; 426/417; 426/457; 426/632
[51] Int. Cl.² ..................... A23L 1/20; A23D 5/02
[58] Field of Search ........... 426/250, 417, 457, 632

[56] References Cited
UNITED STATES PATENTS

| | | | |
|---|---|---|---|
| 3,294,549 | 12/1966 | Vix et al. | 426/417 X |
| 3,295,985 | 1/1967 | Cavanagh | 426/417 X |
| 3,645,752 | 2/1972 | Baxley | 426/632 |
| 3,689,287 | 9/1972 | Mitchell | 426/457 |
| 3,800,056 | 3/1974 | Mitchell | 426/632 X |

Primary Examiner—James R. Hoffman
Attorney, Agent, or Firm—Allison C. Collard

[57] ABSTRACT

A process for making fat-free flavorless peanut flakes having utility as a high protein food extender by forming an aqueous mix of finely ground raw peanuts, or raw peanuts from which a part of the oil has been removed by mechanical pressure, drying the mix into a thin stratum, and extracting the oil with a solvent such as hexane. The process includes making full-fat, or partially defatted, flavorless shelf-stable peanut flakes or flour by the removal of volatile flavor compounds from an aqueous emulsion-suspension of finely ground raw peanuts, heating the emulsion-suspension to high temperatures, and dehydrating the cooked emulsion-suspension. Antioxidants and metal complexing agents may be added to the emulsion-suspension prior to dehydration. The aqueous suspension-emulsion is useful for preparation of milk-like beverages after removal of volatile flavor compounds, before or after dehydration. Defatted, partially defatted, and full-fat peanut flakes are useful in formulations for sandwich spreads, confections, imitation meat-type items, breakfast cereals and in peanut butter to modify consistency and reduce stickiness in the mouth, and as extenders for meat poultry, and fish.

8 Claims, No Drawings

PROCESS FOR MAKING FLAVORLESS FOOD EXTENDERS DERIVED FROM PEANUTS, AND A METHOD OF RECOVERING PEANUT OIL

Peanuts are highly valued in many areas of the world as a source of oil for food and industrial uses, since they have a protein content of 27 to 30%, and an oil content of about 50%. The oil is usually obtained by hydraulic or screw pressing. In these processes it is necessary to heat the peanuts to high temperatures to obtain an efficient release of the oil. This results in scorching and browning of the material known as "press cake," from which the oil has been expressed. Since it is not possible to remove all of the oil by pressure alone, about 6 to 15% of the oil usually remains in the press cake. To obtain an oil-free press cake, it is necessary to extract residual oil by means of solvents. However, because of the high temperatures generated in the pressing operation, the oil-free residue is dark in color and of poor flavor. For these reasons, the press case from oil mills is usually not suitable for use in human foods, and is sold as an animal feed ingredient.

In U.S. Pat. Nos. 3,689,287 and 3,800,056, the applicant has described processes for manufacturing pre-cooked peanut flakes having satisfactory shelf life even though the flakes contain considerable quantities of oil. It has also been shown in U.S. patent application Ser. No. 453,615 filed Mar. 22, 1974, that whereas raw peanuts have a prolonged shelf life, the shelf life of peanut flakes containing oil is dependent to a considerable degree on the time-temperature relationships in cooking the water slurry of finely ground peanuts prior to drying. It was postulated that pro-oxidants are formed during limited cooking, and that these pro-oxidants are inactivated, or that oxidation inhibitors are formed, during further cooking, especially at elevated temperatures. It has been found that these effects of heat treatments are due chiefly to changes occurring in the non-oil portion of the peanut material.

As indicated in U.S. Pat. Nos. 3,689,287 and 3,800,056, low fat, high protein peanut flakes may be prepared from precooked full-fat peanut flakes by solvent extraction. While this is a feasible method of preparing essentially fat-free flakes, the applicant has improved the process for producing fat-free flakes and peanut oil in a manner that greatly increases the rate of production and thus increases commercial feasibility. When used in large scale operations, this process will not only yield excellent quality peanut oil, but will also provide essentially oil-free, white, flavorless, peanut flakes with a protein content of 54 to 60% which may be used to increase the protein content of many foods.

A 100% increase in the rate of production is achieved by drying an uncooked aqueous slurry of finely ground peanuts rather than a cooked slurry. When the slurry is cooked, the proteins coagulate and starch gelatinizes, causing a great increase in consistency. Because of this, it is essential to use more water in preparation of a slurry which is to be cooked than in preparation of a slurry which is not to be cooked, since the consistency of the slurry must fall within limits which permit it to spread evenly onto the surface of the drum for drying.

In the processes described in U.S. Pat. Nos. 3,689,287 and 3,800,056, dry peanuts are ground to a very fine state, mixed with water, and cooked prior to drum drying. Drum drying of an uncooked slurry prepared in this manner results in leakage of peanut oil as the material is being dried. The effect of this is that the oil drops from the drum surface, resulting in an economic loss, and oily flakes which cannot be handled in a satisfactory manner. It has now been found that no oil leakage occurs when an uncooked slurry of finely ground peanuts is dryed if the fine grinding is conducted in the presence of water. This method, described in U.S. patent application Ser. No. 453,615, involves grinding raw shelled whole peanuts, or peanuts from which a portion of the oil has been removed by pressure, with water to form a slurry of smooth consistency. Another advantage of this method is that fine grinding, mixing, and emulsification are completed in one operation with resultant savings in time.

Since the purpose of the process of the present invention is to produce fat-free peanut flakes and peanut oil, cooking prior to drying is not necessary since essentially no oil remains in the flakes after solvent extraction, and thus the flake cannot become rancid. Rancidity occurs as a result of oxidation of fats or oils. The oil is also of good quality, and has excellent shelf life after extraction from the flakes.

The inventive process provides a flaked form of the peanut from which the oil is easily removed by solvent extraction, thus yielding white defatted flakes of high quality since the damaging effects of the high temperatures generated in hydraulic and screw pressing are avoided.

This new process involves breaking the plant cells, which contain the oil, by grinding. Obviously, it is not commercially feasible to extract oil from a pasty mass of finely ground dry peanuts. On the other hand, oil is easily extracted from the flakes which are formed by drying the slurry prepared by disintegrating the peanuts in the presence of water. The texture of the flakes formed in this manner facilitates immediate penetration of the extraction solvent.

Flakes prepared by the process described in this application are instantly rehydratable and have excellent water absorption and water holding capacity. These properties are important with respect to certain uses for flakes in food products, as for example in extending ground beef, fish or poultry.

Further advantages of the process described in this application are that various materials may be added to the water slurry of finely ground peanuts. By this means, the added materials are incorporated into the flakes formed by drying the slurry. Among such materials are soy flour or protein, cottonseed flour or protein, food coloring such as caramel color, nutritionally essential amino acids and other substances which improve the color, texture, flavor, or nutritive values with respect to intended food uses. Antioxidants and synergists may be added to the slurry, if desirable, to protect the extracted oil from oxidation.

To produce the highest quality flakes, it is preferable that the red skins be removed from the shelled peanuts. Depending upon the ultimate use of the flakes, it may be also desirable to remove the hearts which have a bitter flavor. Shelled peanuts which have been blanched to remove red skins are commercially available and may be used in this process. It is preferable not to use peanuts which have been roasted prior to or after blanching.

As previously indicated, some of the oil may be removed from the peanuts by mechanical pressure prior to processing them into flakes by the method described in this application provided that the method used for removing some of the oil does not cause heat damage to the non-fat constituents (protein and carbohydrates). Peanuts from which some of the oil has been removed by mechanical pressure as described in U.S. patent application Ser. No. 453,615, are suitable for this purpose.

A convenient method for forming the aqueous slurry of finely ground peanuts involves an initial coarse grinding of the peanuts through ⅛-inch holes in the plate of a grinding mill, such as a meat grinder on a Reitz Disintegrator, in order to reduce the particle size of the peanuts without breaking enough oil cells to yield an oily sticky mass. The coarse peanut meal obtained in this manner is then combined with only enough water to form a slurry which can be transferred to a second mill where it is ground through a fine screen or passed between the rotating carborundum rotor and stator of a colloid-type mill where the clearances are set to yield a slurry of smooth consistency free of any particulate matter. In addition to the grinding action, the oil is emulsified by this treatment, and the emulsion is stabilized by the soluble protein constituents of the slurry. The slurry may be conveniently dried on a double or single drum dryer, assuming that the moisture content of the slurry is adjusted to provide a suitable consistency for the type of drum dryer which is used. The peanut flakes formed by this method should be subjected to solvent extraction as soon as possible to avoid oxidation of the oil. Solvent extraction equipment which can be used for this purpose is commercially available.

A further improvement has been effected with regard to the methods for producing the oil-containing precooked dehydrated peanut flakes and spray dried products described in U.S. patent application Ser. No. 453,615. In has been found that, although the dehydrated peanut materials produced by the processes described in that application have a very bland flavor, it is possible to reduce the flavor to an essentially zero level if the peanut-water slurry is treated to remove volatile flavor compounds prior to processing it into dehydrated forms. This was conveniently accomplished in an agitated thin film evaporator operated at atmospheric pressure or under vacuum. The compounds which are responsible for the flavor of raw peanuts are removed with the water vapor which evaporates from the thin film of slurry. The presence of the compounds in the condensate of evaporated water may be readily detected as a strong unpleasant raw odor and flavor. The slurry, after passage through the thin film evaporator, or any other suitable equipment to remove volatile flavor compounds is then precooked and dehydrated as described in U.S. patent application Ser. No. 453,615.

The peanut-water slurry after passage through the thin film evaporator is excellent as a base for a milk-like beverage. When such a slurry was diluted with water to a protein content of about 3.0%, and an oil content of 5.0% (one part full-fat peanut material and nine parts water), the appearance was essentially that of whole cow's milk. It was flavored to closely resemble cow's milk by the addition of a small amount of cream flavoring and sugar.

When it is desirable to produce the base material for the milk-like beverage, the peanuts may be finely ground before mixing with water, as described in U.S. Pat. Nos. 3,689,287 and 3,800,056, or the peanuts may be finely ground with water as described in U.S. patent application Ser. No. 453,615.

Fat-free drum dried peanut flakes are excellent as meat extenders since the protein has been rendered insoluble by drum drying. On the hand, proteins in thinly sliced defatted peanuts are largely soluble in water and enzymes are still active.

In the following, a number of a examples are given to illustrate more fully, the various methods by which the fat-free flakes were produced from ground unroasted peanuts.

EXAMPLE 1

Five pounds of blanched unroasted peanuts were ground through ⅛-inch holes in a grinder such as the type used to grind beef. The coarsely ground peanuts were mixed with 5 pounds of water and passed through a colloid mill equipped with carborundum-surfaced rotor and stator set for a clearance of about 0.004 to 0.010 inch. (Other types of mills might be used provided that the slurry formed is an emulsion-suspension of oil and finely divided solids.) The smooth slurry was dried on a drum dryer and scraped off with doctor blades, forming a dry stratum which was broken into flakes. The flakes were then extracted with hexane to remove oil. Hexane was evaporated from the flakes. The fat-free flakes obtained were white, odorless, and flavorless, with a protein content of between 55–60%. Peanut oil of good quality was obtained by distillation of hexane from the extract.

EXAMPLE 2

Five pounds of blanched peanuts, from which about one-half of the oil had been expressed by applying pressure, were ground through ⅛-inch holes in a meat grinder. The coarsely ground peanuts were mixed with 7 pounds of water and passed through a colloid mill equipped with carborundum-surfaced rotor and stator set for a clearance such that the material which passed through the mill had a smooth consistency. The clearance was usually set between 0.004 and 0.010 inch. The smooth slurry was dried on a drum dryer and scraped off the revolving drum, forming a dry stratum which was broken into flakes. The flakes were then extracted with a fat solvent such as hexane to remove oil. After evaporation of hexane from the flakes they were completely free of flavor and were white in color. The flakes are instantly rehydratable in water. The dry flakes were, for some purposes, ground into flour or powder form. Hexane was removed from the oil by evaporation, and the oil was then suitable for refining in the usual fashion.

EXAMPLE 3

Peanuts were processed as described in Examples 1 and 2 with the exception that, after blanching to remove red skins, the hearts (epicotyl and hypocotyl) were separated from the cotyledons and discarded prior to grinding the cotyledons. (The hearts contain substances which have a slightly bitter flavor, and if the finished peanut flakes are to be used in very bland foods it may be advantageous to remove the majority of the hearts from the peanuts.)

EXAMPLE 4

Peanuts were processed as described in Examples 1 and 2 with the exception that substances such as oil insoluble food coloring (caramel coloring) or flavors, nutrients such as amino acids, vegetable and animal proteins, and/or carbohydrates were incorporated into the slurry prior to drying it.

EXAMPLE 5

Five pounds of blanched unroasted peanuts were ground through ⅛-inch holes in a grinder. The coarsely ground peanuts were mixed with about 5 pounds of water and passed through a colloid mill equipped with carborundum-surfaced rotor and stator set for a clearance between about 0.004 and 0.010 inch. This slurry, of smooth consistency, was mixed with about ten pounds of water. It was then passed into an agitated thin-film evaporator. The outer jacket of the evaporator was heated to a temperature between about 212° and 300°F. The flow rate of the slurry through the evaporator was such that the chemical compounds which cause uncooked peanuts to have a "raw peanut flavor" were removed along with the water which evaporated from the thin film of slurry as it passed through the evaporator. The condensed water vapor which was removed from the the peanut slurry had a pronounced unpleasant odor. When the process was conducted to reduce the moisture content of the emulsion-suspension from about 75% water to 66%, or less, all raw peanut flavor was removed from the emulsion-suspension, or slurry, leaving it essentially flavorless. The slurry was then heated under pressure to a temperature between about 212° and 325°F in a scraped surface heat exchanger or by direct contact with injected steam or by a combination of both of these heating methods. Within this temperature range the desired effects which result in stabilizing the oil against oxidation are achieved by heating for longer times at the lower temperatures or shorter times at the higher temperatures. The required time at any temperature can be provided by suitable holding equipment. Prolonged holding at the higher temperatures must be avoided to avoid damaging the quality of the product. Heating as long as 60 minutes at 212°F and about 1 second at 325°F have been found to be satisfactory; however, in continuous commercial operation it would obviously be impractical to hold the product for prolonged periods of time at elevated temperatures.

EXAMPLE 6

The procedure in this example was the same as in Example 5 with the exception that after passage through the heat exchanger, the cooked emulsion-suspension was drum dried or spray dried as has been described in U.S. Pat. Nos. 3,689,287 and 3,800,056, and U.S. patent application Ser. No. 453,615.

EXAMPLE 7

The procedure in this example is the same as in Example 5 with the exception that the thin-film evaporator was operated under vacuum by connecting a vacuum pump or steam ejector to the condenser. It was thus possible to remove water and raw peanut flavors at relatively lower temperatures.

EXAMPLE 8

The procedure in the example is the same as in Examples 5 and 6 with the exception that the emulsion-suspension was not dehydrated and was used in preparation of a milk-like beverage. Water was added to the emulsion-suspension, after removal of volatile flavor compounds in the agitated thin-film evaporator, to achieve the desired protein to oil ratio. When full-fat peanuts are used as the starting material, a dilution of 1 part peanut-solids with 9 parts water provides a beverage with about 3.0% protein and 5.0% oil. If peanuts from which one-half the oil has been removed are used as the starting material, a dilution of the deflavored emulsion-suspension suspension to achieve a peanut to water ratio of 1 to 9 provides a beverage with 4.1 percent protein and 3.0% oil. Cow's milk contains about 3.2% protein and 3.5 to 4.0% fat. Other suitable methods might be used to remove volatile flavors.

EXAMPLE 9

The procedure in this example is the same as in Example 5 with the exception that flash evaporation of a portion of the water, brought about by direct contact of the emulsion-suspension with superheated steam at about 300°F, was used to remove the chemical compounds which are responsible for raw peanut flavor. Other methods of evaporation might also be used. For example a similar porcess can be conducted at reduced pressure (in vacuum).

In the United States, over five hundred million pounds of peanut butter are consumed each year and hundreds of millions of pounds of peanuts are roasted or used in confections. The major percentage of the world's peanuts are crushed to obain peanut oil, and the protein-rich residue is used for animal feed or fertilizer.

When peanuts are roasted or fried in oil, they develop the flavor with which they are usually associated, however, when peanuts are processed into flakes or other forms as described in U.S. Pat. Nos. 3,689,287, 3,800,056 and U.S. patent application Ser. No. 453,615 filed Mar. 22, 1974, the roasted flavor does not develop. Thus, the flakes, spray dried flour, or other forms may be flavored and colored as desired and are instantly rehydratable. These basic food ingredients may be produced with protein contents ranging from about 30 to 60% protein and 0 to 50% oil. It is possible to utilize these new basic ingredients in developing a variety of food products having good nutritional values and acceptability in the human diet.

A. PRECOOKED PEANUT FLAKES IN CONFECTIONS

Coconut-flavored Candy Candy

Precooked peanut flakes may be used as a substitute for ground or grated coconut in confections when a method of preparation is followed which maintains the integrity of the texture of the peanut flake or other dehydrated form. Thus, highly acceptable coconut flavored candy has been produced by the formula and procedure given in Example 1. Since the confection is formulated to achieve the desired consistency without cooking, and the moisture content is limited, the peanut flakes do not lose their structural identity, and thus the texture of the confection resembles that of certain types of coconut candy. Other proportions of peanut flakes, powdered sugar and glucose syrup may also be used.

EXAMPLE 10

Imitation coconut candy was prepared by using the following ingredients:
720 g partially defatted precooked peanut flakes
1816 g confectioner's sugar
1040 g corn syrup (light Karo)
200 g 70% sorbitol 12 Tbl. coconut flavor
2 tsp. vanilla flavor The peanut flakes and powdered sugar were combined. The corn syrup, coconut flavor, vanilla flavor and sorbitol were combined with the peanut flakes and sugar. The mixture was formed into pieces of suitable size which were coated, if desired, with one of several available coatings for confections. In many tests, taste panelists reported the product was coconut candy and acceptance ratings for this product were exceptionally high. Full-fat, partially defatted, or defatted peanut flakes may be used in preparing the imitation coconut candy. The composition of full-fat peanut flakes most closely resembles that of coconut, as shown in Table I.

IMITATION ALMOND PASTE AND MARZIPAN

One of the major ingredients of Marzipan is almond paste which is very expensive. Precooked peanut flakes or precooked spray dried peanut flour may be used to prepare imitation almond paste with considerable economy. Peanut paste prepared by fine grinding of precooked full-fat peanut flakes is devoid of raw or roasted peanut flavor and may be flavored to closely resemble almond paste. The composition of almonds and peanuts may be compared in Table I. By the addition of vegetable oil to precooked peanut paste the composition and consistency can be adjusted to closely resemble that of almond paste. Peanut paste was prepared by passing precooked full-fat peanut flakes through a colloid mill equipped with carborundum surfaced rotor and stator. Other suitable mills may also be used.

EXAMPLE 11

Imitation almond paste was prepared by milling precooked full-fat peanut flakes or precooked spray dried full-fat peanut flour to achieve fine particle sizes. A colloid mill equipped with carborundum rotor and stator set for a clearance of from about 0.012 inch was used, but other suitable grinding devices may also be employed. During reduction of the solids to fine particle sizes, oil is released and a paste is formed. Almond flavor was added to this paste to achieve a flavor resembling that of almond paste. Vegetable oil was incorporated, as required to give the material the consistency of almond paste. (Almonds, Table 1, have a higher oil content than peanuts.) In a typical instance, 400 grams of precooked peanut paste, having a composition of about 29% protein, 49% oil, 17% carbohydrate, 2.0% fiber, 2.0% ash, and 3.0% moisture, was combined with 40 grams of peanut oil. Other oils, such as corn cottonseed, or soybean may be used. This paste was flavored to resemble almond paste by adding synthetic almond flavor. The imitation almond paste may be used in preparation of Marzipan and in any recipe or food formulation which requires almond paste, for example in certain baked products.

EXAMPLE 12

Imitation Marzipan was prepared by using the following ingredients:
400 grams peanut paste
12 tsp. almond flavoring
40 grams vegetable oil
225 grams corn syrup (light Karo)
500 grams confections's sugar
40 grams 70% sorbitol Precooked peanut paste was prepared by passing precooked full-fat peanut flakes through a colloid mill equipped with carborundum surfaced rotor and stator set for a clearance of about 0.010 inch. 400 grams of this paste was mixed with 40 grams of vegetable oil, 225 grams of corn syrup (glucose syrup), 500 grams of confectioner's sugar and 40 grams of 70% sorbitol. Concentrated almond flavor was added to obtain a distinct flavor of almonds. The mixture was molded into fruit shapes using Marzipan molds. Molding and release properties were excellent. When appropriately shaped and colored taste panelists could not distinguish this Marzipan from that made with almond paste.

B. NON-STICKY TEXTURIZED PEANUT BUTTER

Peanut butter is a popular cracker and sandwich spread. Its major defect is a tendency to stick to the roof of the mouth. Peanut butter is also used in confections. In attempting to produce peanut flakes with the flavor of peanut butter, the flakes were mixed with peanut butter in several proportions. Since peanut butter has a very low moisture content, about 2 to 3%, the physical integrity of the flakes is maintained. In the course of this work, it was discovered that the addition of peanut flakes to peanut butter greatly reduced the gummy, sticky character of peanut butter as judged by "mouth feel." The peanut flakes became coated with peanut butter, and the flavor of the peanut butter was not diluted or decreased; however, the presence of the flakes dispersed throughout the mass of peanut butter decreased the ability of the finely divided peanut butter particles to remain in gummy masses and to adhere to each other. Since the "Standard of Identity" established by the Food and Drug Administration for peanut butter requires that 90% of the material in peanut butter be derived from peanuts, addition of peanut flakes probably would not be considered adulteration, and peanut butter containing peanut flakes could be labeled Peanut Butter.

Peanut flakes may be added to peanut butter in preparation of confections. Consistency is controlled by the ratio, by weight, of the peanut flakes to peanut butter. The greater the percentage of peanut flakes, the stiffer the consistency. A mixture of peanut butter and peanut flakes having a stiff consistency may be formed into pieces and coated with chocolate or other suitable coatings for confections. Powdered sugar or sugar syrup may be added to the peanut butter-peanut flake mixture. In these applications full-fat, partially defatted, or defatted peanut flakes may be used.

EXAMPLE 13

Peanut Flakes in Peanut Butter Spreads. About 400 grams of commercially prepared peanut butter was warmed over hot water to soften it. More specifically, it was heated in the top of a double boiler pan to a temperature of about 140°F. About 100 grams of precooked peanut flakes were added and incorporated by stirring. The warm mixture was poured into jars and allowed to cool. After cooling the "texturized peanut butter" was spreadable and stickiness in the mouth was greatly reduced when compared to a control sample without added peanut flakes. In commercial practice, the peanut flakes would be combined with the peanut butter while it is hot from the grinding process to which the roasted peanuts are subjected.

EXAMPLE 14

About 50 grams of peanut flakes were stirred into 400 grams of hot (125° to 170°F) peanut butter. The mixture was poured into jars and allowed to cool without being disturbed. The product was less sticky than the control sample.

EXAMPLE 15

Peanut Flakes in Peanut Butter Confections. About 600 grams of commercially produced peanut butter at a temperature of about 150°F was combined with about 200 grams of precooked full-fat peanut flakes. The mixture was spread into a layer about ½inch thick. After it become cool it was cut into squares and dipped into melted chocolate to form a coating of chocolate. In a variation of this, finely powdered sugar and/or corn syrup (Karo) was added to the peanut butter - peanut flake mixture to provide a sweet flavor. In a typical formulation, powdered sugar in an amount of about 10% of the weight of the peanut butter — peanut flake mixture was added. The texture of these confections is controlled by the relative proportions of peanut flakes and peanut butter and sugar and syrup.

C. SANDWICH AND CRACKER SPREADS

Since peanut butter first became commercially available about 80 years ago, many attempts have been made to use it in formulations for sandwich and cracker spreads having various flavors. In spite of these efforts, the overriding flavor characteristic of all of these products has been that of roasted peanuts. The availability of precooked peanut flakes now makes possible the creation of dry storage stable sandwich and cracker spread mixes having flavors such as bacon and onion, ham, cheese, chicken and others. These products have no residual peanut flavor. In preparing these products, it is necessary to rehydrate the flakes with about an equal weight of water to achieve a spreadable consistency. Thus, a spread prepared from precooked full-fat peanut flakes contains about 15% protein, 25% oil, and 8% carbohydrate. A spread prepared from partially defatted precooked peanut flakes (40% protein, 33% oil) contains about 20% protein and 16.5% oil. The protein and fat contents of potted meat type products average about 15.5 and 18.0%, respectively.

EXAMPLE 16

Bacon and Onion-flavored Spread. Bacon-onion flavored spread mix was prepared by combining the following flavoring substances with precooked full-fat peanut flakes:

93 grams precooked full-fat peanut flakes
4 grams dehydrated bacon bits
3.5 grams salt
4 grams dehydrated onion flakes
3.5 grams synthetic bacon flavor powder
1.0 gram garlic powder
0.2 grams garlic powder
caramel coloring (powder)

The dry mix which was formed was storage stable without refrigeration. The mix is then combined with about an equal amount water by weight, and 30–60 grams of mayonnaise to form a spreadable consistency. The proportions listed above for the flavor susbstances can be varied slightly to suit individual tastes. Partially defatted precooked peanut flakes may alse be used but full-fat flakes are preferred.

EXAMPLE 17

Cheese-flavored Dry Mix for Making Cracker or Sandwich Spreads. A dry mix which was storage stable without refrigeration and from which a cheese or cheese-onion or cheese-garlic flavored spread was conveniently prepared was formulated with 93 grams (3 ⅛ oz.) precooked full-fat peanut flakes and minor proportions of substances to create the desired flavor sensation when the mix was combined with about an equal weight of water and about 30 to 60 grams of mayonnaise to form a spreadably consistency. The following proportions of peanut flakes and flavor materials in the dry mix was statisfactory, but the proportions of flavor substances may be varied slightly to suit individual tastes.

93 grams precooked full-fat peanut flakes
7 grams synthetic cheddar cheese flavor
1.5 grams salt
2.0 grams dehydrated onion flakes
0.2 grams garlic powder
cheese coloring (powder)

D. POTATO CHIP DIPS

Almost all dips for potato chips and other similar snack items are prepared using cream cheese, cottage cheese (or other cheeses) or sour cream. These products must be kept refrigerated. In preparation of dips they are mixed with flavoring ingredients and thinned to the desired consistency with milk. Precooked peanut flakes or precooked spray-dried peanut flour, preferably full-fat, was used as a replacement for the cheese and sour cream in formulating very palatable dips. Flavor ingredients usually employed in formulating dips were mixed with the peanut flakes to make dry mixes for dips. The dry mixes are storage stable for at least six months when stored at room temperature. In preparation for use they need only be rehydrated with water. The dips prepared using peanut flakes contain a higher percentage of protein than those prepared from cream cheese or sour cream.

EXAMPLE 18

Cheese-flavored Dip. Mixes such as were described in Examples 16 and 17 were rehydrated with about 1½ to 2 times their weight of water. The rehydrated mixes were passed through a colloid mill equipped with carborundum surfaced rotor and stator set for a clearance such that thorough homogenation and disintegration of all solid particles occurs. Typically, the clearance was set for 0.006 to 0.010 inch. In some instances, a stabilizer such as alginate was added to the dry mix in amounts to improve consistency of the colloid-milled dip. Usually, the desired results were obtained when the dip contained about 0.02 percent of alginate or other stabilizer.

E. IMITATION MEAT-TYPE PRODUCTS AND EXTENDED MEAT AND POULTRY PRODUCTS.

Products having texture characteristics resembling those of certain luncheon meats may be made using a precooked peanut material as the major component in addition to water. The flakes must be rehydrated with approximately an equal weight of water, mixed with an edible binding agent such as dehydrated egg albumen, starch, or other suitable substances. The desired flavor, for example, ham, beef or chicken, salt, and flavor enhancers, one of which is monosodium glutamate, are added. The mixture is packed firmly into a mold or container, sealed and heated until it has congealed. If precooked full-fat peanut flakes are the chief source of protein and oil, and dehydrated egg albumen is the binding agent, the finished imitation meat product has a protein content of about 18% and an oil content of about 22%. If precooked partially defatted peanut flakes (40% protein, 33% oil) are used, the finished imitation meat item contains about 23% protein and 15% oil. All meat bologna contains only about 13.3% protein and 22.8% fat.

Rehydrated precooked peanut flakes may be combined with diced or ground meats, poulty, or fish in various porportions in the preparation of extended meat items. Palatability and acceptability, in taste tests, of these products has been excellent. Important cost savings would be expected because of the relative high price of meat.

EXAMPLE 19

Imitation Luncheon Meats. A ham-flavored luncheon-type imitation meat product was made by the process of combining the following materials in proportions indicated.

454 grams (1 pound) precooked full-fat peanut flakes
454 milliters (1 pound) water
45 grams dehydrated egg albumen
14 grams salt (NaCl)
9 grams monosodium glutamate
18 grams synthetic ham flavors and spices
Food coloring sufficient to provide a ham-like color in the mix The food coloring was added to the water which was then combined with the peanut flakes and other components of the mix. The albumen binds the materials together under the influence of heat. The proportions of flakes, albumen, and water were selected to give a realistic luncheon meat texture in the finished product. Albumen was very effective as the binding agent and adds protein to the product, but other binders such as starch might be used. Diced or ground ham may be incorporated into the mix. The mixture was packed firmly into a size 303–406 can which was then sealed and heated for about 30 minutes at 240°F. After the can had cooled to about 70°F, the top and bottom was cut off and the imitation meat product was removed. Other types of molds or containers have also been used, including flexible casings.

EXAMPLE 20

Boneless Chicken Roll. A boneless chicken flavored roll, containing about one-third cooked chicken and two-thirds rehydrated peanut flakes was made by the process of combining the following materials in the proportions indicated.

454 grams precooked full-fat peanut flakes
454 milliters chicken broth (essentially fat free)
454 grams diced or ground cooked chicken
45 grams dehydrated egg albumen
27 grams salt (NaCl)
9 grams monosodium glutamate
14 grams synthetic chicken flavor The diced chicken, peanut flakes and other dry components were combined with the chicken broth. The mixture was packed firmly into size 303–406 cans and heated for about 30 minutes at 240°F to cause the albumen to bind the ingredients together to form a mixture similar to that of roasted sliced chicken or turkey. The cans were allowed to cool to room temperature, or below, the top and bottom were cut off, and the chicken roll was removed. It was sliced on a meat slicer with revolving disc blade into slices about 1/16 to ⅛-inch thick.

Table 1

| COMPOSITION OF PEANUTS, ALMONDS, AND COCONUT | | | |
|---|---|---|---|
|  | Peanuts | Almonds | Coconut |
| % Protein | 26.3 | 18.6 | 7.2 |
| % Fat | 48.4 | 54.2 | 64.9 |
| % Carbohydrate | 17.6 | 19.5 | 23.0 |
| % Ash | 1.9 | 3.0 | 1.4 |
| % Water | 5.4 | 4.7 | 3.5 |

1. A process for producing flavorless thermostable fat-free peanut flakes having utility as a high protein food extender comprising the steps of:
   coarsely grinding blanched unroasted peanuts so as to release only a minimum amount of peanut oil;
   mixing one part of the coarsely ground peanuts with one to two parts of water by weight;
   disintegrating the solids and homogenizing the mixture to form a suspension of finely divided peanut particles and emulsified oil;
   drying the emulsion-suspension on a drum dryer to form flakes; and
   extracting oil from the flakes with a solvent and evaporating residual solvent from the flakes to obtain fatfree high protein flakes.

2. The method as recited in claim 1 additionally comprising the step of evaporating solvent from the extracted oil to obtain oil of good quality.

3. The method as recited in claim 1 wherein prior to the said step of mixing coarsely ground peanuts with water said method comprises removing a portion of the oil from the peanuts by means of pressure in a manner which does not cause browning discoloration.

4. The method as recited in claim 1 additionally comprising the step of pulverizing said flakes into a powder to form a flour of high protein.

5. The method as recited in claim 1 wherein prior to said step of grinding said method comprises removing the skins and hearts from the peanuts.

6. The method as recited in claim 1 wherein prior to said step of drying the method comprises adding a flavoring and/or coloring agent to the suspension.

7. The method as recited in claim 1 wherein prior to said step of drying the method comprises adding proteins, carbohydrates, cereal flours, amino acids, or other nutrients to the suspension.

8. The method as recited in claim 1 wherein said step of grinding and homogenizing is accomplished in a colloid mill having rotor and stator surfaces capable of disintegrating solids.

* * * * *